Patented July 15, 1930

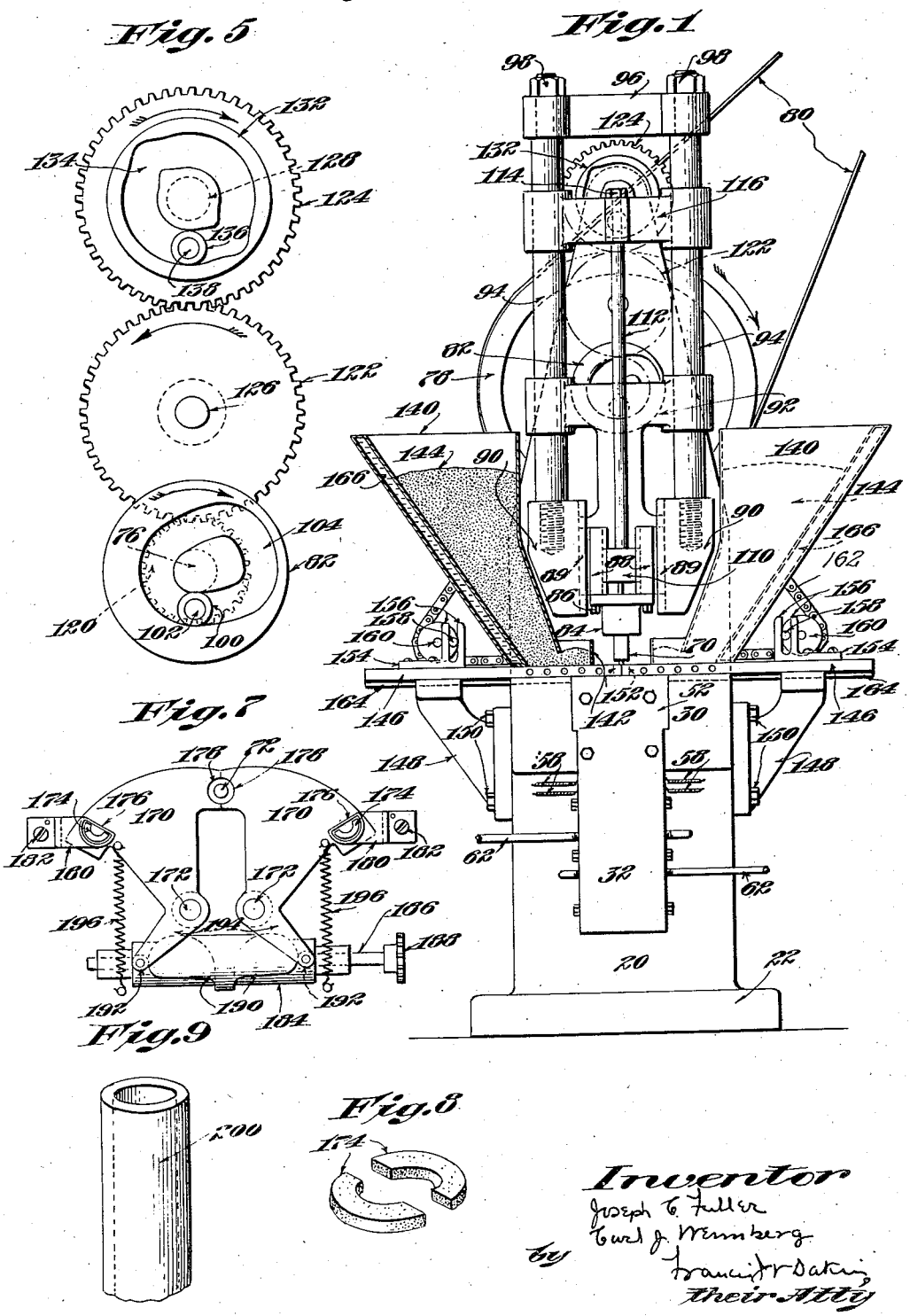

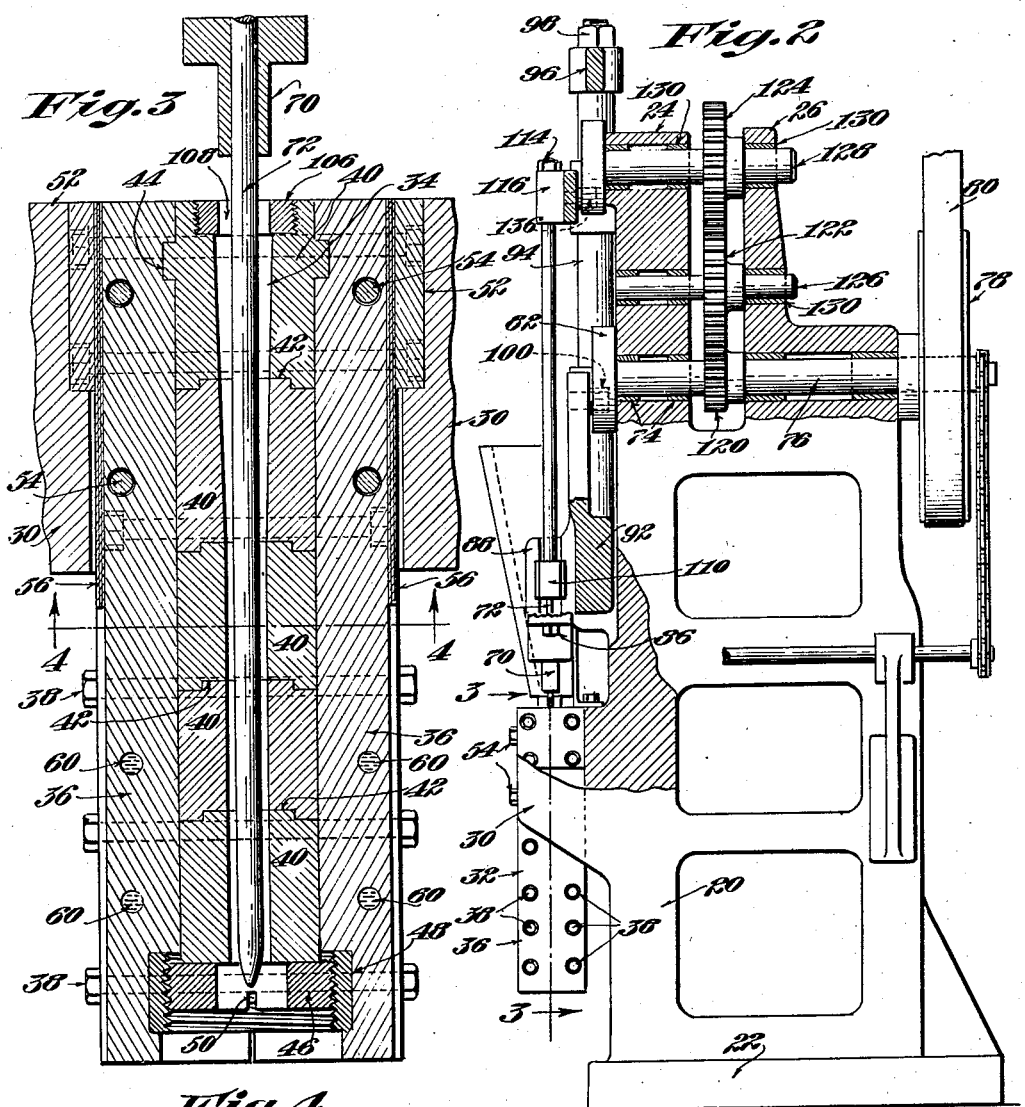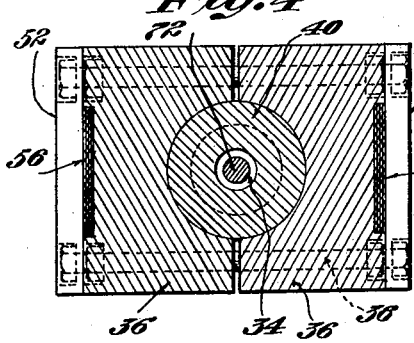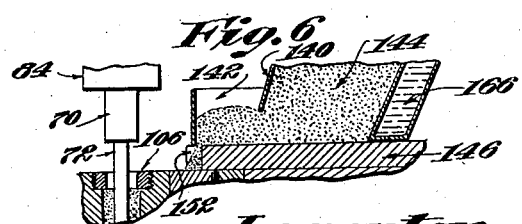

1,770,396

UNITED STATES PATENT OFFICE

JOSEPH C. FULLER, OF WEST NEWTON, AND CARL J. WENNBERG, OF EAST MILTON, MASSACHUSETTS

MACHINE FOR MOLDING TUBULAR MATERIAL AND METHOD OF PRODUCING SAME

Application filed July 16, 1926, Serial No. 122,880. Renewed October 14, 1929.

This invention relates primarily to a process for molding sheets, rods, tubing and the like in continuous form from suitable compositions and to a machine for carrying out said process. Our invention is designed more particularly with reference to molding from compositions made up of a binder and a filler. Various classes of materials such as resins, gums, rubber compounds, synthetic gums, synthetic resins, phenolic or cresylic condensation products, furfural compounds or resins and others may be employed as binders and wood fibre, asbestos fibre, cotton floc and other vegetable fibres and inorganic substances such as mica, barytes, clays, zinc oxides, lithopone and others may serve as fillers.

Heretofore, the use of the foregoing compositions for molding various objects and forms of material has been restricted to three processes. The first process involves the use of molds or dies and has been generally confined to the molding of relatively small objects or those of more or less defined intricate form. The second method has been directed to the making of rods and tubing in which paper or fabric, coated or impregnated with the molding composition, is rolled up on itself for the rod and on a mandrel for tubing and then pressed and cured. The third method produces sheeting and involves the building up of the sheets from a plurality of layers of the material used in the second process after which the laminated mass is pressed and cured. The products of the last two methods are more in the nature of raw materials which may be cut up for various uses in many arts.

All of these methods are, however, open to serious objections. First, the sizes of the sheets and strips and the lengths of the rods and tubing are subject to limitations imposed by the character of the mechanical devices such as molds, dies, mandrels and presses, required in carrying out the various methods. Only relatively small sheets and short lengths of tubing can be produced. Second, the methods are all slow and expensive thereby greatly increasing the cost of production. They further require expensive equipment, the use of which involves time and labor and slows down the production. No satisfactory process has heretofore been evolved for producing such molded materials in continuous sheet, strip, rod or tube form.

The principal object of our invention is the provision of a method for molding substances of the character hereinbefore mentioned in a continuous form and in one operation.

Another object of the invention is the provision of a method which is applicable to all forms of sheets, strips, rods, tubing and the like having an infinite variety of size and of shape in cross-section.

A further object is to secure a continuous production which may be cut off in lengths to suit various uses and in which the molding operation is continuous thereby greatly increasing the amount produced in a given time.

Another object of the invention is the provision of a machine of simple, durable and efficient construction for carrying out certain steps of our process.

An additional object is the provision of a machine which is automatic, which may be easily adapted to various forms of product and which will turn out a product of high character and uniformity.

Other objects of the invention will be more specifically set forth and described hereinafter.

Our invention contemplates the molding of various mixtures of the character specified by forcing the mixture through a molding space sufficiently long to permit it to be reduced to a plastic state by heat, then to be molded and cooled before emerging from the outlet end of the molding passage. The friction, however, between the molded mixture and the sides of the molding passage in molds sufficiently long to permit the molded mixture to harden and set before emerging has heretofore proved an insurmountable obstacle to the use of such a process with mixtures of the kinds hereinbefore specified. We have discovered, however, that this friction can be overcome to an extent which makes it possible to mold in a continuous form by making the mold in parts relatively movable to each other in a direction longitudinally the molding passage. By moving the movable part of the mold in a forward direction when the mixture is fed into the inlet end of the molding passage the friction is overcome sufficiently to permit the mixture to be fed forward one step. When the movable part is retracted after its forward movement, the contents of the molding space are held against rearward movement. The molding is, therefore, continuous in a step-by-step manner.

The first step of our process consists in the preparation of the mixture or material to be molded in a form suitable therefor. The mixture may be either granulated or a powder or may be pressed into a form corresponding to the cross-sectional form of the molding space, such as strips for sheets, circular disks for rods or of semi-circular form for tubing, each being of a thickness suitable for one feeding.

The second step of our process consists in forcing the prepared material in a step-by-step manner through a suitable formed molding space. The material is forced in the inlet end of said passage and the pressure thereby developed by successive additions of material molds it and causes the finished molded product to emerge in a step-by-step manner from the outlet end.

The third step consists in applying heat for reducing the mixture to a plastic state which may be done by heating the mold at the inlet end and for a distance therefrom sufficient to make the mixture thoroughly plastic and moldable.

The fourth step may or may not be necessary and that is cooling the molded product before it passes out of the molding space. In some mixtures, the setting or hardening occurs after heat has been applied for a certain length of time and in such cases cooling is not required but in many mixtures it is necessary to bring about the setting. In some cases, the cooling may be secured by increasing the length of the mold and in other cases by the use of water or other expedients for cooling the outlet end of the mold.

Various forms of apparatus and machine may be used for carrying out certain steps of our process. The shape of the molding space in cross-section will, of course, depend upon the form of the product desired and its length will vary more or less in accordance with its cross-section and with the nature of the particular mixture or material being molded. The molds may also be made in various forms of construction dependent somewhat upon the form of the product and upon its nature. For the purpose of illustrating our invention we have shown in the drawings a machine of a form adapted for producing tubing.

In the accompanying drawings illustrating one form of our invention, Figure 1 is a front elevation with a portion cut away of one form of machine constructed and adapted to operate in accordance with our invention; Fig. 2 is an end elevation of the same looking from right to left in Fig. 1 with certain parts shown in section to disclose the interior mechanism; Fig. 3 is a central vertical sectional view on line 3—3 in Fig. 2 of the molding unit, the mandrel being shown in elevation; Fig. 4 is a cross-sectional view of the molding unit on line 4—4 in Fig. 3; Fig. 5 is a front elevation of the gear train for reciprocating the mandrel from the main shaft; Fig. 6 is a cross-sectional view of the upper part of the molding unit, one feeding element and the lower portion of the hopper for feeding powdered material, to the molding unit; Fig. 7 is a plan view of an alternative mechanism for feeding the material to be molded in semi-circular tablet form; Fig. 8 is a view in perspective of two pressed tablets in semi-circular form of the material to be molded and Fig. 9 is a view in perspective of a portion of tubing molded by the machine shown.

Referring to the drawings, 20 indicates a frame square in cross-section of sturdy and heavy web construction adapted for withstanding the strains of the molding operation. It may be made in any suitable manner, however, and may be varied to conform to various operating instrumentalities and uses. The base 22 of the frame may be extended on all sides for stability and to afford means for bolting it to a suitable support. The upper part of the frame is extended upwardly in the form of two standards 24 and 26 for carrying the driving mechanism.

Supported in an overhanging part 30 on the front of the frame 20 is arranged the mold 32 which in the present form of the machine invention is provided with a through and through vertical bore 34 circular in cross-section. The mold may be constructed in any suitable manner but we have found that the construction shown is adapted for withstanding the great pressures engendered in the molding operations and yet is simple to make from a manufacturing standpoint. The mold comprises a central bored portion held between two longitudinal supporting members 36 (Fig. 4) fastened together by bolts 38. The central portion is made up of a plurality of short sections 40, each section having its lower end recessed to receive a correspondingly shaped extension or projection 42 on the upper end of the next lower section in order to lock all the sections together in series. This construction also permits very accurate boring and the enlarging of the bore at its upper end (Fig. 3) by tapering it. The interlocking of the sections 40 together makes it possible to get perfect alignment in the bore 34.

Preferably, the central portion of the mold is circular in cross-section and fits in semicircular longitudinal recesses in the members 36, which recesses are slightly less than a semi-circle so that there is a slight gap between the adjacent edges of the members 36 (Fig. 4). This permits the two members 36 to be drawn into very tight engagement with the central portion to support it against internal pressure at all points. For locking the sections 40 tightly together to avoid marking the molded material and at the same time to hold the central portion of the mold against longitudinal movement in relation to its supporting members the top section 40 is provided with an annular rib or flange 44 engaging a corresponding recess formed in the supporting members and a bored plug 46 is threaded into a bushing 48 which is held between the two members 36 in suitable recesses formed in the lower end thereof. The plug 46 is provided with opposite recesses 50 to receive a spanner or other tool whereby it may be turned up to press all the sections 40 together into tight relation.

The mold or molding unit 32 is provided on each side with a shouldered extension 52 which fits in a suitable shouldered recess in the overhanging part 30 of the frame of the machine so that the mold is hung therein. It may further be fastened in place by bolts 54 passing through the sections 36 and threaded into the main body of the frame.

For heating the upper part of the molding unit 32, suitable flat electrical heating units 56 may be arranged in the recessed outer sides of the members 36 and connected by conductors 58 to a source of electrical power. The heating units may, however, be arranged in any other suitable location desired as for instance in inner recesses in the members 36 or in some cases even in recesses in the central portion of the mold, where conditions permit. If desired, the lower part of the mold may be provided with cooling means, such, for instance as bores 60 connected by pipes 62 to a water supply or it may be supplied with any other suitable form of cooling means.

For feeding the material to be molded into the top end of the bore 34 of the molding unit any suitable means may be employed such as a plunger 70 mounted for a vertical reciprocating movement and in making tubing a mandrel 72 is loosely mounted in the plunger and extends downwardly through the bore 34.

Any suitable means may be provided for reciprocating the plunger and mandrel but preferably these members should be given independent reciprocating movements since it is desirable that the upward movement of the mandrel should take place while the plunger is at the end of its downward stroke and before it starts to move upwardly. The mandrel moving downwardly with the plunger assists in forcing the molded composition downwardly in the molding unit but on its upward stroke frees itself from the tubing which is held down by the plunger.

One means for accomplishing these results is shown and comprises the following. In the upper part of the frame 20 is rotatably mounted in bearing sleeves 74 a main shaft 76 carrying on its rear end a pulley wheel 78 adapted to be driven by a belt 80 from a source of power and on its front end a cam 82. The plunger 70 has an expanded head which is locked in a cup 84 fastened by bolts 86 to a pair of guides 88, each of which is provided with a lateral vertical tongue 89 adapted to slide in a groove in one of a pair of forwardly extending bosses 90 formed on the frame of the machine. The two guides 88 are formed on and project forwardly from the lower part of a cross-head 92 loosely mounted for vertical reciprocation upon two posts 94, each of which is threaded at its lower end into a boss 90. The upper ends of the posts are connected together in stable relation by a cross-bar 96 held in place by nuts 98 on the reduced threaded ends of the said posts. The cross-head 92 is reciprocated by the main shaft through the instrumentality of a roll 100 mounted on a pin 102 set in the back face of the cross-head and riding in a groove 104 in the cam 82. On each revolution of the main shaft the plunger is reciprocated downwardly and upwardly to complete one feeding movement in which the plunger on its downward travel enters the top end of the bore 34. If desired, the top end of the bore may be enlarged and threaded to receive a threaded washer 106 having a central opening 108 of the exact size to receive the plunger. As shown in Fig. 3, the opening 108 may be slightly smaller than the flared top of the bore thereby forming a shoulder which tends to hold the composition being molded down in the bore.

The mandrel 72 is fixedly mounted at its upper end in a block 110 and passes loosely through the plunger 70 down into and through the bore of the molding unit. Its lower end may be pointed and preferably the mandrel is of such length that said lower end at all times extends out of the lower end of the bore. The block 110 is arranged between the guides 88 and in sliding engagement therewith, having lateral tongues engaging vertical grooves in the guides and is connected by a rod 112 and a nut 114 to a cross-head 116 mounted for vertical reciprocation on the posts 94.

The cross-head 116 is reciprocated from the main shaft through the instrumentality of a gear train comprising a gear 120 fixed on the main shaft and gears 122 and 124 fastened to stud-shafts 126 and 128 respectively (Fig. 5). The latter shafts are rotatably mounted in suitable sleeve bearings 130 in the upright extensions 24 and 26 of the frame and upon the forward end of the shaft 128 is fixed a cam 132 provided with a cam-path 134 adapted to receive a roll 136 carried by a pin 138 fixed in the back face of the cross-head 116. The gears 120 and 124 are in the ratio of two to one so that the latter makes one complete revolution for each two revolutions of the former and the cam-path 134 is double, that is, divided into two parts of like form, each part being adapted for reciprocating the cross-head and mandrel downwardly and upwardly one complete cycle on each half revolution of the gear 124.

The cam-path 134 is so arranged that the stroke of the mandrel is shorter than the stroke of the plunger and that the mandrel moves downwardly during the latter part of the downward stroke of the plunger and upwardly before the latter starts to rise.

For feeding the material to be molded into position to be forced by the plunger down into the bore of the molding unit any suitable means may be used dependent, however, to some extent upon the character of the material. When the material is in the form of a powder any suitable kind of hopper may be utilized and in Figs. 1 and 6 of the drawings we have shown two hoppers 140 arranged one on each side of the plunger, the lower inner portion of each being extended inwardly at 142 to prevent the material 144 bridging. Two slides 146, having their outer ends supported by brackets 148 fastened by bolts 150 to the sides of the frame 20, are provided for pushing the powdered material from the bottoms of the hoppers into position to be forced downwardly by the plunger. The inner ends of the slides may have semi-circular recesses 152 for carrying the material forward and compressing it into a circular form under the plunger. For reciprocating the slides longitudinally to accomplish the feeding operation, each slide has secured to its top face a bracket 154 having two upright fingers 156 spaced apart to receive a pin 158 set eccentrically in a wheel 160 adapted to be rotated by a chain 162 from the main shaft 76. The wheels 160 may be rotatably supported on the brackets 148 or otherwise if desired and to prevent lateral movement of the slides their bottom faces may each be provided with a longitudinal tongue 164 adapted to slide in a corresponding groove in the bracket 148 and in the top face of the overhanging part 30 and molding unit.

In case it is found necessary because of the radiation of heat from the molding unit, the hoppers 140 may be made with double walls to provide a space 166 for the circulation of water or other cooling medium to maintain the material at the proper temperature to prevent clogging or bridging.

When the material to be molded is in compressed form, for instance, as shown in Figure 8, then any suitable feeding mechanism may be substituted for the hoppers and slides and one such means is shown in Fig. 7 comprising a pair of feeding members 170, each pivotally mounted on a pin 172 and adapted for feeding a semi-circular lozenge 174 (Fig. 8) from a supply holder 176. The feeding members are mounted on top the molding unit in position to feed the lozenges horizontally against the mandrel 72, the feeding end of each member having a semi-circular recess 178 for carrying the lozenge. The holders 176, semi-circular in cross-section are mounted in upright position on brackets 180 fastened by screws 182 to the top of the molding unit or overhanging part 30 of the frame of the machine and each feeding member 170 has its main portion in the form of a segment lying under the lower end of the holder 176. When the feeding members are retracted the recessed portions are thrown back of the holders to permit lozenge to drop into the recesses 178 and to be carried to the mandrel on the feeding stroke of the feeding members.

Any suitable means may be provided for operating the feeding members, one being shown comprising a roll 184 fixed on a shaft 186 carrying a sprocket wheel 188 whereby it may be rotated from the main shaft of the machine by a sprocket-chain not shown. The roll is provided with a cam surface 190, adapted to be engaged by rolls 192 on the ends of arms 194 integral with the feeding members. Springs 196 hold the feeding members in separated position except when they are thrown together by the cam operating on the roll 192.

The operation of the machine is simple. The rotation of the main shaft reciprocates the plunger and mandrel and operates the feeding means. These parts are so timed that the material to be molded is fed into position over the top of the bore in the molding unit and against the mandrel while the plunger is in a raised position. The plunger, while the feeding means holds the material in place, descends and forces the material down into the bore of the molding unit. During the latter part of the downward stroke of the plunger the mandrel moves downwardly thereby assisting the plunger. At the end of its downward stroke, however, and while the plunger remains stationary, the mandrel starts on and completes its upward stroke, after which the plunger moves upwardly. The feeding members after the end of the plunger enters the bore are retracted to secure a fresh supply of material which is fed forward when the plunger is in a raised position. This cycle of operations is continued so long as the machine operates.

The tubing is thus formed by successive feeding operations and is reduced to a plastic condition by the heating units. The pressure exerted by the plunger and the additions of material forces the plastic material forward in tubular shape through the mold in the lower part of which it sets either naturally or when cooled and then emerges from the mold in completed hardened form.

In the making of tubing 200 such as is shown in Fig. 9, from a compound requiring heat to reduce it to plastic condition, it is necessary to employ a mandrel having a longitudinal movement relative to the mold in order to form the tubing and to move it forward through the mold. The mandrel in effect not only forms the bore in the tubing but its movement reduces the friction engendered in forcing the material and tubing through a mold of a length sufficient to permit the material to be rendered plastic, and molded and hardened before it emerges therefrom. Although we have shown in the illustrative machine, a movable mandrel it is to be understood that in some cases it may be desirable to have the molding unit also movable longitudinally and in other cases to have the molding unit movable and the mandrel stationary.

It is further to be understood that our invention is not to be limited to the making of tubing alone since the machine herein illustrated may be adapted for making rods, sheets or tubing of various shapes of cross-section or tubing in two parts. In short, our invention both as to the method and the machine is capable of very broad application and may be embodied in many different constructions all of which would after the disclosures herein be apparent to one skilled in the art.

Our invention has many advantages, the most important of which are that the products may be made in any lengths and sizes, produced continuously and at a comparatively low cost. There are many other advantages. For instance, in the use of the machine herein described, bushings of various lengths may be made by feeding at intervals into the bore of the molding unit separating elements of any suitable kind. Another advantage with certain compositions is that the molded material emerges with a high polish thereby making it unnecessary to furnish or finish it.

It is to be understood, therefore, that our invention is to be construed broadly except where specifically limited in the following claims.

What we claim is:

1. A machine for forming tubular material from moldable composition having, in combination, a fixed molding member provided with a straight molding passage circular in cross-section therethrough, a plunger member for pressing the material to be molded into one end of said passage, a reciprocating member mounted in said passage for forming the bore in the material being molded, and means for reciprocating said last mentioned member independently of said plunger member.

2. A machine for forming tubular material from moldable composition having, in combination, a fixed molding member provided with a molding passage therethrough open at both ends, a mandrel in said passage and extending longitudinally thereof, reciprocatory means for forcing the material to be molded into one end of said molding passage and means for reciprocating said mandrel independently of said forcing means, and means for reciprocating said mandrel independently of said forcing means.

3. A machine for molding suitable material in a continuous form having, in combination, a molding member provided with a straight passage therethrough, a reciprocating plunger for forcing the material to be molded into one end of said passage, a mandrel extending through said plunger into said passage and means for reciprocating said mandrel independently of said plunger.

4. A machine for molding suitable material in a continuous form having, in combination, a molding member provided with a straight passage therethrough, a plunger for forcing the material to be molded into one end of said passage, a mandrel extending longitudinally through said plunger into said passage at one end, means for reciprocating said plunger and said mandrel independently of each other, and means for heating the material being molded.

5. A machine for molding suitable material in a continuous form having, in combination, a molding member provided with a straight passage therethrough, a plunger for forcing the material to be molded into one end of said passage, means for reciprocating said plunger, a mandrel extending through said plunger into said passage at one end, means for reciprocating said mandrel independently of said plunger, means for heating the material being molded, and means for cooling the material after it has been molded.

6. In a machine of the character described, the combination of two molding members in sliding engagement and formed to provide a closed molding space therebetween but open at the ends, means for accomplishing a relative reciprocal movement between said two members in a direction longitudinally said molding space and means operating independently of said two members for forcing the material to be molded into one end of said space.

7. In a machine of the character described, the combination of two molding members in sliding engagement with each other and formed to provide a straight extended molding space therebetween but open at the two ends only, means for forcing intermittently the material to be molded into one end of said molding space, and means for reciprocating one of said molding members in relation to the other and independently of said forcing means.

8. In a machine of the character described, the combination of a molding unit having a through and through molding space, means for feeding the material to be molded into one end of said space and a mandrel extending through said feeding means into said space and longitudinally movable independently of said feeding means.

9. In a machine of the character described, the combination of a molding unit having a through and through molding space, a mandrel mounted in said space and longitudinally movable therein, means for feeding the material to be molded into one end of said space, and means for moving said mandrel on the feeding operation in the same direction with the feeding means and for retracting said mandrel while said feeding means is at the end of its forward movement and stationary.

10. In a machine of the character described, the combination of a molding unit having a through and through molding space circular in cross-section, a mandrel mounted and longitudinally movable in said space, means for feeding moldable material into one end of said space and means for reciprocating said mandrel to assist the feeding action and for retracting said mandrel while said feeding means is at the end of its feeding movement and stationary.

11. In a machine of the character described, the combination of a molding element having a through and through molding space, means for forcing moldable material into one end of said space, a mandrel element mounted in said space; and means for moving said mandrel independently of said forcing means.

12. In a machine of the character described, the combination of a molding element having a through and through molding space, means for forcing moldable material in a step-by-step manner into one end of said space, a mandrel element projecting through said forcing means and extending into said space and means for reciprocating said mandrel independently of said forcing means.

13. In a machine of the character described, the combination of a molding element provided with a bore, means for forcing moldable material into one end of said bore, means for heating said molding element to render said material plastic and a mandrel element mounted and longitudinally reciprocable in said bore independently of the movement of said forcing means.

14. In a machine of the character described, the combination of two elements spaced apart to form a molding space open at the two ends only, one of said elements being movable longitudinally said space and in relation to the other of said elements and independently of the means hereinafter mentioned, and means for forcing moldable material into one end of said space.

15. In a machine for molding in a continuous form, the combination of two elements spaced apart to form a molding space open at the ends only, one of said elements being movable in relation to the other of said elements and independently of the means hereinafter mentioned, and means for forcing the material to be molded into the inlet end of said space by successive feeding movements.

16. A method of molding in a continuous form consisting in preparing the material to be molded in dry form, forcing the material in successive amounts through a confined space open at the ends only, applying heat to said material while in said confined space to render it plastic, removing a material part of the friction engendered in the molding process and then cooling said molded material before it emerges from said space.

17. A method of molding tubular products consisting in preparing the material to be molded in powdered form, forcing said powdered material in successive amounts through a straight molding passage open at the ends only, said passage being annular in cross-section, applying heat to said material to render it plastic, removing a material part of the friction engendered in the molding process to facilitate the progress of said molded material and cooling said molded material before it emerges from the other end of said molding passage.

18. In a machine of the character described, the combination of a molding element having a straight passage therethrough, a reciprocating plunger for forcing moldable material into one end of said passage in an intermittent manner, means for feeding the material to said plunger, a mandrel projecting through said plunger into said passage and means for reciprocating said mandrel independently of the reciprocation of said plunger.

19. In a machine of the character described, the combination of a molding element having a straight passage therethrough, a plunger, means for reciprocating said plunger for forcing moldable material into one end of said passage, a mandrel extending through said plunger into said passage and means for moving said mandrel forwardly with the plunger and backwardly while the plunger is at rest and before it is retracted.

20. In a machine of the character described, the combination of a molding element having a straight vertical passage therethrough, a plunger, means for reciprocating said plunger to force moldable material into one end of said passage, a hopper for supplying said moldable material to said plunger, a mandrel extending through said plunger into said passage and means for reciprocating said mandrel independently of the reciprocation of said plunger.

21. A method of molding tubular products consisting in preparing the material to be molded in powdered form, molding said material in a continuous form by forcing it by intermittent additions of material through a molding passage of the shape desired in the presence of heat, removing a material part of the friction engendered in the molding process to facilitate the progress of said material through said passage while being molded and then cooling said material to cause it to set and harden.

In witness whereof, we hereunto set our hands this fourteenth day of July, 1926.

JOSEPH C. FULLER.
CARL J. WENNBERG.